United States Patent [19]

Coffey et al.

[11] 3,746,936
[45] July 17, 1973

[54] DIELECTRIC HOUSING FOR ELECTRICAL CONDUCTORS IN A METER HOUSING

[75] Inventors: William F. Coffey; Kenneth R. Coley, both of Stratford; Emmett J. McLaughlin, Fairfield, all of Conn.

[73] Assignee: Westinghouse Electric Corporation, Pittsburgh, Pa.

[22] Filed: Nov. 30, 1971

[21] Appl. No.: 203,217

[52] U.S. Cl............. 317/120, 339/126 R, 317/111, 174/52 R
[51] Int. Cl. .......................................... H02b 1/20
[58] Field of Search................ 324/156; 339/126 R, 339/198 R, 210 R, 214 R; 174/52 R, 59, 153 R, 153 G; 317/104, 106–108, 111, 118, 120

[56] References Cited
UNITED STATES PATENTS

| | | | |
|---|---|---|---|
| 3,097,259 | 7/1963 | McMillen | 174/153 G |
| 3,236,204 | 2/1966 | Joseph | 174/153 G |
| 3,366,845 | 1/1968 | Esler | 317/106 |
| 3,189,793 | 6/1965 | Krone | 339/198 R |
| 3,138,419 | 6/1964 | Hammell | 339/214 R |
| 3,090,936 | 5/1963 | Maltby | 339/210 R |
| 2,824,166 | 2/1958 | Madaras | 174/59 |
| 3,155,450 | 11/1964 | Filson | 339/210 R |
| 3,569,917 | 3/1971 | Vlijmen | 339/198 R |
| 3,366,729 | 1/1968 | Pauza | 339/126 |
| 3,053,564 | 9/1962 | Evans | 174/52 R |

*Primary Examiner*—Robert K. Schaefer
*Assistant Examiner*—Gerald P. Tolin
*Attorney*—A. T. Stratton, L. P. Johns et al.

[57] ABSTRACT

A dielectric housing for mounting a pair of electrical conductors in place between the meter section and the distribution section of a multimetering service entrance panelboard which sections are separated by a sheet metal barrier for preventing unauthorized service access to bus bars within the meter section; the housing comprising a pair of duplicate die-cast plastic housing members which when assembled is located within an opening in the barrier for mounting and maintaining a pair of conductors in place between the meter section and the distribution section; the assembled housing members having external grooves for engagement with peripheral portions of the barrier forming the opening for the dual purpose of supporting the housing in place and of preventing access to the meter section through the opening; and the assembled housing members also comprising an enclosed compartment through which the conductors extend and in which integral projection portions of the two housing members are disposed in transverse alignment for maintaining prescribed spacing between the conductors; and the housing members having pairs of spaced conductor-receiving openings in the end walls and edge walls which openings are enlarged at the outer surfaces of the end and edge walls for providing greater oversurface clearance between the conductors than air clearance, and which housing members include corresponding projections and recess means at the walls of the abutting members for increasing the oversurface clearance or electrical creepage distance between the conductors and the barrier.

9 Claims, 6 Drawing Figures

Patented July 17, 1973 3,746,936

Patented July 17, 1973

DIELECTRIC HOUSING FOR ELECTRICAL CONDUCTORS IN A METER HOUSING

BACKGROUND OF THE INVENTION

1. Field of the Invention

This invention relates to electrical multimetering service entrance panelboards and more particularly it pertains to a panelboard in which watthour meter sockets and associated bus bars are preassembled into subassemblies for subsequent field installation in a box-like panelboard structure in conjunction with circuit breakers.

2. Description of the Prior Art:

In multiple tenant buildings a service entrance panelboard is usually employed which panelboard includes a plurality of watthour meters and circuit breakers. To prevent unauthorized access to electrical service or to the bus bars the mounting bases for the several meters as well as the bus bars have been contained within elongated rectangular cases of sheet metals. At spaced intervals the walls of the sheet metal have been provided with openings for authorized access to the enclosed or meter section of the case. Notwithstanding various efforts to prevent them, unauthorized access through the openings have persisted such as by the insertion of electrical conduits or wires in addition to the authorized electrical conductors. As a result the problem of avoiding unauthorized methods for obtaining non-metered electric serve has persisted.

Associated with the foregoing has been the problem of providing authorized conductors leading from a watthour meter to the external side of the meter case to which conductor circuit breakers of a conventional type may be attached. The problem has been one of many facets including conductor support, insulation, spacing in compliance with Underwriters' Laboratories, Inc., and avoidance of electrical creepage between the conductors as well as the barrier to prevent arcing therebetween.

SUMMARY OF THE INVENTION

It has been found in accordance with this invention that the foregoing problems may be overcome by providing a housing strcture for supporting electrical conductors and composed of two separable molded members of identical configuration which when assembled provide opposite side walls, opposite edge walls, and opposite end walls which form an enclosing compartment into which projecting portions of the members extend from the inner surfaces of the opposite side walls for supporting the conductors in spaced relation with respect to each other, one of the end walls having at least one pair of conductor-receiving openings and at least one of the edge walls having similar openings, the portions of the openings on the outer surfaces of the end and edge walls being greater than the portions of openings adjacent the inner surfaces thereof whereby greater over-surface clearance or electrical creepage distance than air clearance is provided between the conductors, the projections within the assembled members extending from the inner surfaces of the edge and end walls for providing greater over-surface clearance between the conductors, and groove means on the outer surfaces of the side walls of each member for supportive engagement with the peripheral portion of an opening in the sheet metal barrier between metering and distributive sections of a power panel in which opening and housing is disposed.

A salient feature of the invention is the solution of a number of prior existing problems including the prevention of unauthorized access to unmetered electric power, the support and installation of electric conductors in a prescribed manner, and the provision of molded half portions having interfitting edge surfaces for satisfying electric code requirements for electrical spacing and for excluding moisture and dust from the housing.

DESCRIPTION OF THE PREFERRED EMBODIMENT

Figures 1, 6:
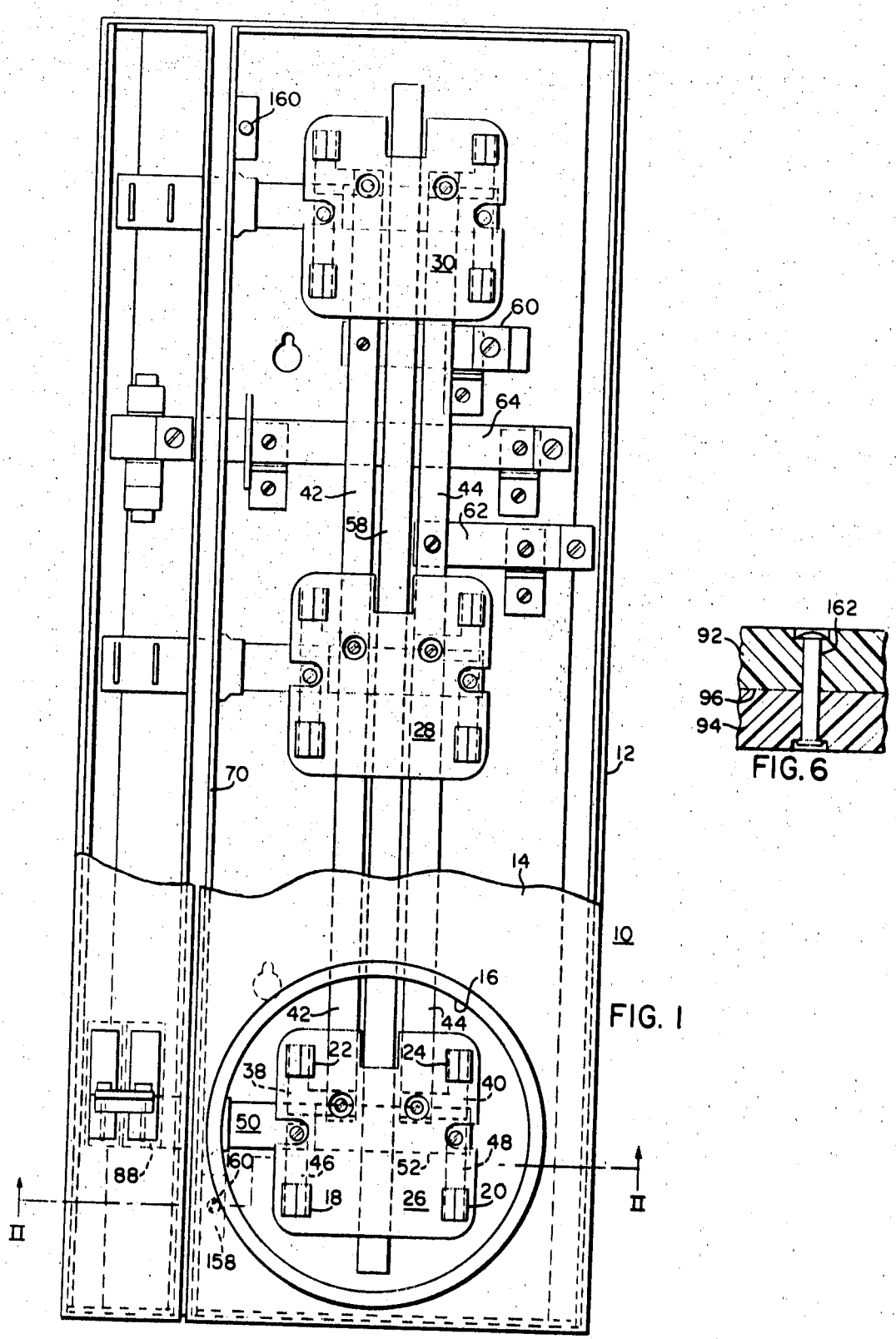
FIG. 1 is an elevational view of a multimetering panelboard, with portions broken away, in accordance with this invention.
FIG. 6 is a horizontal sectional view taken on the line VI—VI of FIG. 4.
Figure 2:
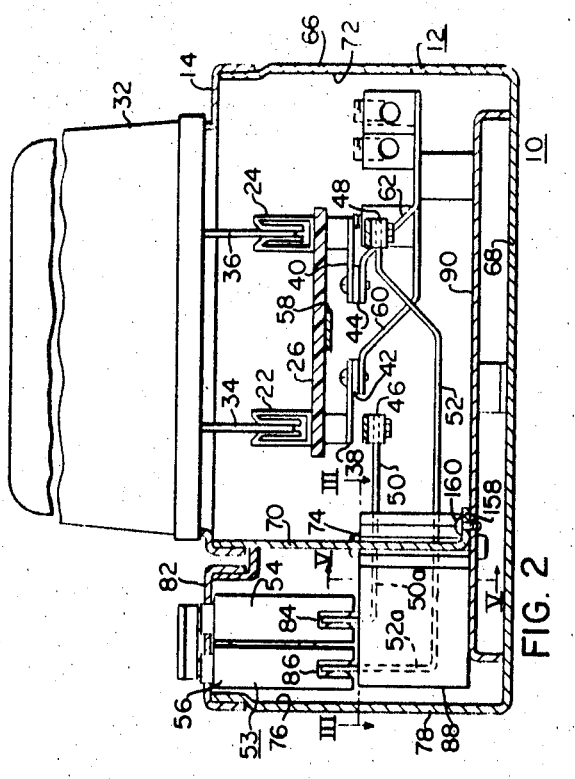
FIG. 2 is a vertical sectional view taken on the line II—II of FIG. 1.

As shown in FIGS. 1 and 2 a multiple meter panel is generally indicated at 10 and it includes a generally rectangular case 12 and a removable cover 14, the upper portion of which is broken away in FIG. 1. The cover 14 has a plurality of circular apertures of which only one aperture 16 is shown in FIG. 1. The apertures 16 are aligned with spaced sets of four plug-in meter clips or jaws 18, 20, 22, and 24 which are mounted on a terminal support base 26. The housing shown in FIG. 1 includes three vertically spaced meter locations with terminal bases 26, 28 and 30. As shown in FIG. 2, a watt-hour meter 32 is mounted on the cover 14 and over the aperture 16 so that four stab-like contacts of the meter are attached or connected to four meter clips 18, 20, 22 and 24 only two such contacts 34 and 36 as shown in FIG. 2. The terminals 22 and 24 are connected by connectors 38 and 40 to main bus bars 42 and 44, respectively. Anoher pair of stab-like contacts (not shown in FIG. 2) engage the plug-in terminals 18 and 20 which are connected by connectors 46 and 48 to a pair of conductors 50 and 52 (FIG. 2) by which electric current is transmitted to various circuits through a two pole circuit breaker 53 which comprises two single pole breakers 54 and 56 tied together in a well known manner to provide a two pole device. Power is transmitted to the bus bars 42 and 44 as well as a neutral bus bar 58 by main bus bars 60, 62, and 64, respectively, in a conventional manner as shown in FIG. 1.

As shown more particularly in FIG. 2, the rectangular case 12 which includes a side wall 66, a bottom wall 68, and a barrier or side wall 70 encloses a compartment, or meter section 72. Access to the compartment 72 is limited to authorized personnel in order, among other things, to prevent circumvention of the meter 32. For that reason, watt-hour meters such as the meter 32 are secured in place on the cover 14 in a conventional manner such as by the use of a clamping ring as shown in U.S. Pat. No. 2,076,492, issued Apr. 6, 1937 to A.J. Allen, and assigned to the same assignee as the instant application. Likewise, the cover 14 may be secured in place on the case 10 to prevent surreptitious access to the compartment 72.

As shown in FIG. 2 the conductor 50 and 52 extend through an opening 74 in the barrier 70 to the opposite side thereof. Preferably the opposite side of the barrier 70 is enclosed in a chamber or distribution section 76 which is defined by a side wall 78, the bottom wall 68, a detachable cover 82, as well as the barrier 70.

The conductors 50 and 52 are rigid bar type members of L-shaped configuration having upturned end portions 50a and 52a which form stabs for the attachment of circuit breakers of the type shown in U.S. Pat. No. 2,797,278, issued June 25, 1957, to F.L. Gelzheiser et al., and entitled "Circuit Breaker." The circuit breakers 54 and 56 include clip-type terminals 84 and 86, respectively, for engaging the upper end portions of the stab-like portions 50a and 52a, respectively.

Figure 3:
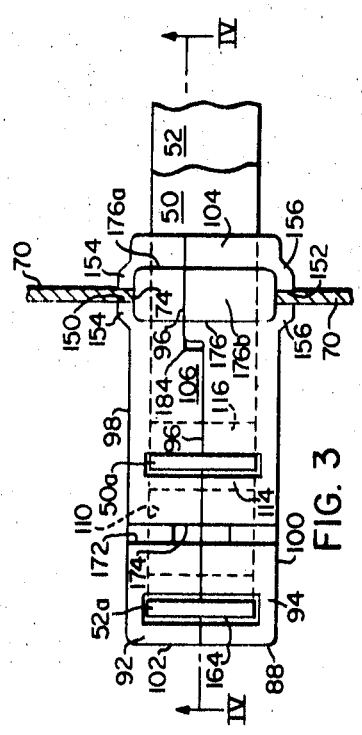
FIG. 3 is a plan view taken generally on the line III—III of FIG. 2.
Figure 4:
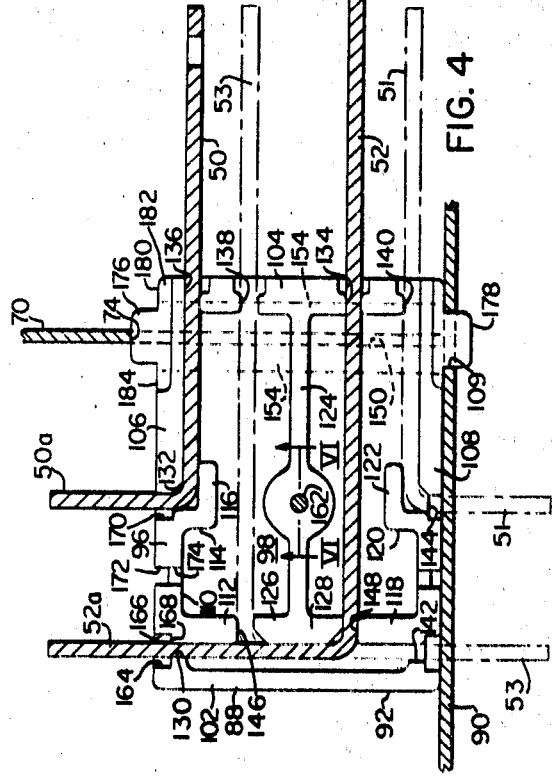
FIG. 4 is a vertical sectional view taken on the line IV—IV of FIG. 3.

In order to retain the conductors 50 and 52 securely in place a housing strcture 88 is provided. The housing structure 88 is a dielectric or electrically insulating member which is preferably mounted on a support member 90 that is fixedly mounted on the bottom wall 68. As shown in FIGS. 3 and 4, the housing structure 88 is disposed in and extends through the opening 74 in the barrier 70. More particularly, the housing structure 88 is comprised of a pair of separable housing members 92 and 94 having abutting edges forming a joint 96. When assembled the housing members 92 and 94 provide the housing structure 88 having opposite side walls 98 and 100, opposite end walls 102 and 104, and opposite edge walls 106 and 108, which enclose a compartment 110.

Figure 5:
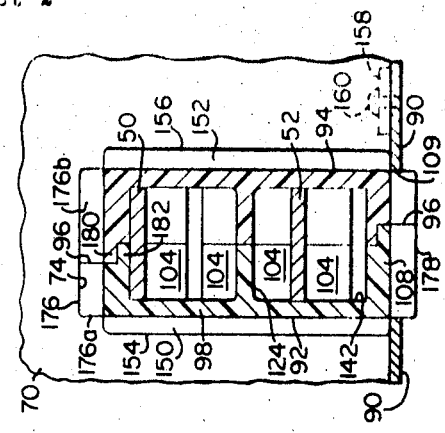
FIG. 5 is a vertical sectional view taken on the line V—V of FIG. 2.

The housing members 82 and 94 are preferably of identical construction. They are composed of a dielectric or resinous material such as a phenolic resin which is preferably shaped by known die casting methods. As shown in FIGS. 4 and 5 the housing member 92 includes a plurality of projections or internal ribs cluidng projections 112 and 114 which extend substantially perpendicular from the inner surface of the edge wall 106. The projection 114 is an L-shaped member having a porion 116 extending substantially parallel to the edge wall 106. A similar pair of projections 118 and 120, the latter of which includes a portion 122, extend from the edge wall 108. A central projection 124 extends from the end wall 104 and terminates in upturned and down-turned projection portions 126 and 128, the latter of which are preferably aligned with the projections 112 and 118 (FIG. 4).

In addition the edge walls 106 and 108 as well as the end wall 104 include a plurality of openings in which the conductors 50 and 52 are secured in place. The edge wall 106 includes openings 130 and 132 through which member portions 52a and 50a, respectively, extend. The end wall 104 includes openings 134 and 136 through which the conductors 52 and 50, respectively, extend. In addition, the end wall 104 includes openings 138 and 140. The edge wall 108 includes openings 142 and 144 which are disposed oppositely from the openings 130 and 132 respectively in the edge wall 106. Clearances or spaces 146 and 148 are disposed between the projections 112 and 126 on the one hand and 18 and 128 on the other hand. Thus, the openings 130, 132, 136, and 134 as well as the clearance 148 are used for supporting and maintaining the conductors 50 and 52 in the solid-line positions shown in FIG. 4.

On the other hand, the housing strcture 88 may be used to support the conductors in the inverted or broken-line positions 51 and 53, whereby the openings 138, 140, 142, and 144 are used. The projection portion 116 cooperates with the openings 132 and 136 for maintaining the conductor 50 in place. Likewise, the spaced ends of the projections 118 and 128 cooperate with the openings 130 and 134 to maintain the conductor 52 in the proper spaced position from the conductor 50.

The hosing structure 88 includes groove means on opposite side walls for maintaining the housing in place relative to the barrier 70. The groove means include a groove 150 and a groove 152 in the side walls 98 and 100, respectively, as shown in FIG. 3. The grooves 150 and 152 are disposed between similar pairs of protrusions 154 and 156 on the outer surfaces of the side wall 98 and 100, respectively. Thus, when the housing structure 88 is in position as shown in FIG. 2 the edge portions of the barrier 70 forming the opening 74 are seated in the grooves 150 and 152, whereby the assembly of the conductor 50 and 52 and the housing structure 88 are additionally supported in place on the support member 90. When assembled the barrier 70 is lowered into position after the housing structure is placed in position. For that purpose the opening 74 extends from the upper surface of the structure 88 to the lower edge of the barrier 70. The barrier 70 is provided with a number of spaced flanges 158 which are secured to the inner surface of the member 90 by screws 160.

It is noted that the housing structure 88 completely occupies the opening 74 with the edge porions of the barrier 70 seated within the grooves 150 and 152, thereby defeating any attempt to enter the compartment 72 through the opening 74 by surreptitious means such as inserting wires through the opening to make connection with the bus bars 42, 44, and 58. The support member 90 cooperates with that construction. As shown in FIG. 6 suitable means such as a rivet 162 are used to hold the assembled housing structure 88 and conductors 50 and 52 together.

Although the spacing between the conductors 50 and 52 and the sheet metal barrier 70 are established to satisfy code requirements for electrical spacing to prevent arcing, it is desirable to maintain dielectric conditions by providing additional oversurface clearance or electrical creepage distance between the conductors 50 and 52 as well as between each of them and the barrier 70. Thus, the actual air clearances between the conductor portions 50a and 52a are, say, about three-quarters inch to maintain opposite polarity and the oversurface clearance or electrical creepage distance between those portions should be a minimum of 1¼ inches to avoid electrical tracking due to the accumulation of contaminates such as dust and moisture on the outer surface of the housing structure 88. Moreover, the oversurface clearance between each of the conductors 50 and 52 and the barrier 70 should be a minimum of one-half inch. The over-surface clearance between the conductor portions 50a and 52a are satisfied by recessing the openings 130, 132, 136, 138, 134, 140, 142 and 144. For example, the opening 130 through which the conductor portion 52a extends has a recess 164 extending completely around that portion (FIG. 3), which recess includes a wall 166 and a wall 168. The wall 168 extends inwardly from the outer surface of the edge wall 106 preferably at a right angle thereto and the wall 168 extends substantially parallel to said outer surface. Thus, the walls of the opening 130 which actually support the portion 52a are spaced inwardly from the outer surface of the edge wall 106. As a result of the recess 164 having the walls 166 and 168 surrounding the portion 52a as well as a recess 170 having similar walls surrounding the portion 50a, the oversurface clearance between the portion 52a and 50 is increased to maintain the desired dielectric conditions. It is noted that the structure of the recess 164 including he the 166 and 168 for the opening 130 obtains for all of the other openings 132 to !44, in order to prevent tracking or surface creepage between the conductors 50 and 52.

As shown in FIGS. 3, 4 additional oversurface clearance or electrical creepage distance may be added between the portions 52a and 50a by providing a groove 172 across the edge wall 106 and parallel to said portions so that the walls increase the surface dimension by the sum of their individual dimensions.

Moreover, in order to increase the oversurface clearance between the conductor portion 50a and 52a through the joint 96 between the edge walls 106 of the housing members 92 and 94, a hole 174 (FIGS. 3 and 4) is provided across the joint and below the bottom wall of the groove 172 to provide oversurface clearance in addition to that of the otherwise straight surface of the joint 96.

The oversurface clearance between the conductor 50 and the barrier 70 is likewise increased by providing a projection 176 which extends upwardly from the top surface of the edge wall 106 (FIGS. 3, 4 and 5) and in the opening 74. A similar projection 178 extends downwardly from the outer surface of the edge wall 108 (FIG. 5) and through a hole 109 in the support member 90. For the position of the housing structure 88 shown in FIGS. 3, 4 the projection 76 provides the necessary oversurface clearance between the conductor 50 and the barrier 70. The projections 176 and 178 are composed of two parts, such as shown for the projection 176 wherein parts 176a and 176b are aligned to form the total projection 176. The part 176a is integral with the housing member 92 and the part 176b is integral with the housing member 94. When the members 92 and 94 are assembled for use, the parts 176a and 176b are aligned and the upper surface of the resulting projection 176 is in abutment with the edge of the barrier 70 forming the upper end of the opening 74 and with the upper portion of the vertical edges forming said opening.

In addition to the foregoing as shown in FIGS. 3 and 5 the adjoining portions of the joint 96 between the members 92 and 94 include interfitting portions 180 and 182 which increase the oversurface clearance between the conductor 70 and the barrier 70 through the joint 96. The interfitting portions 180 and 182 are disposed in the upper edge wall 106 as well as the lower edge wall 108, and extend along the joint 96 from the end wall 104 to a location 184 (FIGS. 3 and 4).

Accordingly, the device of the present invention provides a support housing for electrical conductors which conductors extend through a barrier between a meter section and a distribution section of a multimeter panelboard. The housing comprises two members of identical construction and having interfitting portions which when assembled hold the conductors rigidly in place in accordance with code requirements for electrical spacing to prevent arcing therebetween. Moreover, the housing members are composed of a dielectric material such as a phenolic resin and as such are susceptible to being fabricated by plastic molding procedures. Finally, the housing members when assembled provide for fixed air clearance between the conductors as well as oversurface clearance or electrical creepage distance to avoid tracking.

What is claimed is:

1. An enclosed metering and distributing panel comprising metal walls and a barrier forming an enclosure, at least one set of meter sockets mounted within the enclosure, the barrier having an aperture proximate to the set of meter sockets, bus bars connected to one pair of the set of meter sockets, rigid conductors connected to another pair of the set of meter sockets and extending through the aperture to spaced positions external of the enclosure, the external end portion of the conductors being stab-like members adapted for connection to circuit breaker means, means for mounting the rigid conductors in spaced relation with respect to each other and to the periphery of the aperture and comprising a dielectric housing structure forming an enclosing compartment and having integral projections comprising conductor-support surfaces and opening means for holding the conductor in place, the dielectric housing structure extending through and occupying a portion of the aperture and having opposite side walls, opposite end walls and opposite edge walls, each opposite side wall having groove means engaging opposite peripheral portions of the barrier around the aperture for maintaining the housing structure in place, the dielectric housing structure also having an external oversurface clearance projection extending from each opposite edge wall and in planar alignment with the groove means, one of the projections occupying the remaining portion of the aperture, one of the end walls having at least one pair of conductor-receiving openings and at least one of the edge walls having similar openings, the integral projections comprising a longitudinal projection and transverse projection means for dividing the compartment into three chambers, the longitudinal projection extending from said one end wall having the conductor-receiving openings and to the transverse projection, the transverse projection means being spaced from the other end wall and forming therewith a first chamber which chamber communicates with the other of the openings in the edge wall, the longitudinal projection forming second and third chamber adjacent respective edge walls, the second chamber communicating with one of the openings in the end wall and with one of the openings in one edge wall, and the third chamber communicating with the other of the openings in the end wall and with the first chamber.

2. The apparatus of claim 1 in which housing structure comprises separable housing members comprising abutting edges which members support the conductors.

3. The apparatus of claim 1 in which the spacing between inner surfaces of the side walls is substantially equal to the width of the conductors, and in which the abutting edges of the edge walls and end walls are substantially equally spaced from the side walls.

4. The apparatus of claim 2 in which the groove means comprise a first groove in the outer surface of one of the housing members and a second groove in the outer surface of the other of the housing members.

5. The apparatus of claim 3 in which the opening means for holding the conductors in place comprise a first pair of spaced conductor-receiving slots in one of the end walls and edge walls and a second pair of spaced conductor-receiving lots in the other of the end walls and edge walls of each member, and the first and second slots of one member being aligned with corresponding slots in the other member.

6. The apparatus of claim 5 in which the first pair of slots are in one end wall and the second pair of slots are in one of the edge walls.

7. The apparatus of claim 5 in which the external portions of the slots in the end and edge walls are enlarged, whereby the electrical creepage distance between the conductors is greater than the air distance therebetween.

8. The apparatus of claim 5 in which the projections are within the enclosing compartment and extend inwardly from the inner surface of the edge wall.

9. The apparatus of claim 5 in which the abutting edge of one housing member has a projecting portion that has a length and thickness of lesser dimensions than those of the edge wall, and the abutting edge of the other housing member having a corresponding recess for receiving the projection portion.

* * * * *